(12) United States Patent
Lobzakov et al.

(10) Patent No.: US 9,014,679 B2
(45) Date of Patent: Apr. 21, 2015

(54) SYSTEM AND METHOD FOR ENHANCED CALL INFORMATION DISPLAY DURING TELECONFERENCES

(75) Inventors: Yuriy Yuryevich Lobzakov, Walnut Creek, CA (US); Peter Eymard Baccay, San Jose, CA (US); Colin Mark Werner, Kitchener, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 483 days.

(21) Appl. No.: 12/713,445

(22) Filed: Feb. 26, 2010

(65) Prior Publication Data

US 2011/0212714 A1    Sep. 1, 2011

(51) Int. Cl.
| | |
|---|---|
| *H04M 3/42* | (2006.01) |
| *H04L 12/16* | (2006.01) |
| *H04M 1/725* | (2006.01) |
| *H04M 1/2745* | (2006.01) |

(52) U.S. Cl.
CPC ........ *H04M 1/72566* (2013.01); *H04M 1/2745* (2013.01); *H04M 2250/62* (2013.01)

(58) Field of Classification Search
CPC ....... H04M 3/56; H04M 3/564; H04M 3/567; H04M 3/568; H04M 2203/5063; H04M 2203/2072; H04M 2203/5009; H04M 2203/5054; H04M 2250/62; H04L 12/1813; H04L 12/1818; H04L 12/1822; H04L 12/1827; H04L 65/403; H04N 7/15
USPC ................................. 455/416; 370/260–269; 379/202.01–207.01

See application file for complete search history.

(56) References Cited

U.S. PATENT DOCUMENTS

| | | | | |
|---|---|---|---|---|
| 5,922,071 | A  * | 7/1999 | Taylor et al. ....................... 713/1 |
| 6,600,928 | B1 | 7/2003 | Ahya | |
| 2003/0018901 | A1* | 1/2003 | Burritt et al. ................... 713/185 |
| 2004/0071285 | A1* | 4/2004 | Satoh et al. .................... 379/419 |
| 2004/0224675 | A1* | 11/2004 | Puskoor et al. ............... 455/419 |
| 2005/0018827 | A1* | 1/2005 | Himmel et al. .......... 379/202.01 |
| 2005/0227680 | A1* | 10/2005 | Snowden ....................... 455/416 |

(Continued)

FOREIGN PATENT DOCUMENTS

WO    2005/104512    11/2005

OTHER PUBLICATIONS

European Search Report for European Patent Application No. 10154927.7-2414 dated Aug. 3, 2010.

(Continued)

*Primary Examiner* — Michael Mapa
(74) *Attorney, Agent, or Firm* — Fish & Richardson P.C.

(57) ABSTRACT

An example aspect includes a mobile device that can perform a method where a conference call schedule is kept in a calendaring application, which is made to reference a temporary entry in a contact manager, which tracks access information, such as a dial-in number, an authentication code, and descriptive information for the call, such as a name for the call. The access information from the temporary contact entry is used to establish the call, and the descriptive information from the contact entry is outputted, such as through a display. An entry in a log can be created for the call using the descriptive information from the temporary contact entry. The temporary contact entry can be maintained if the conference call is to be repeated, or else it can be deleted. Such devices and methods provide an enhanced user experience for conference calls, by providing logging and display of more descriptive information about the calls.

19 Claims, 7 Drawing Sheets

(56) References Cited

U.S. PATENT DOCUMENTS

| | | |
|---|---|---|
| 2006/0229097 A1 | 10/2006 | Flynt |
| 2007/0260684 A1* | 11/2007 | Sharma et al. ............... 709/204 |
| 2007/0280459 A1 | 12/2007 | Yee et al. |
| 2007/0291917 A1* | 12/2007 | Berstis et al. ............ 379/202.01 |
| 2008/0222127 A1 | 9/2008 | Bergin |
| 2009/0089055 A1* | 4/2009 | Caspi et al. ................... 704/235 |
| 2009/0156186 A1 | 6/2009 | Lyle |
| 2010/0030788 A1* | 2/2010 | Chen et al. ...................... 707/10 |
| 2010/0073454 A1* | 3/2010 | Lovhaugen et al. ....... 348/14.03 |
| 2010/0098230 A1* | 4/2010 | Bhow ....................... 379/202.01 |

OTHER PUBLICATIONS

European Communication Pursuant to Article 94(3) for European Patent Application No. 10154927.7-2414 dated Jun. 18, 2012, 3 pgs.

European Examination Report for European Patent Application No. 10154927.7-2414 dated Dec. 6, 2012, 7 pgs.

Canadian Office Action for Canadian Patent Application No. 2,732,179 dated Jan. 8, 2013, 4 pgs.

* cited by examiner

SYSTEM AND METHOD FOR ENHANCED CALL INFORMATION DISPLAY DURING TELECONFERENCES

BACKGROUND

1. Field

The following relates to digital assistants, such as mobile phones, or smart phones with calendaring and contact management capabilities, and more particularly to enhancing capabilities of such devices.

2. Related Art

Mobile devices, such as cellular phones and smart phones, are increasingly used to participate in conference calls. Depending on the device and, typically, the software being used on the device, calendaring software may be used to track an impending conference call, such as by storing dial-in information (a conference call number and often an access code) with the calendar entry. In some cases, calendaring software also can provide the dial-in information to a telephone application on the device, when the conference call is about to start. Such calendaring software can provide an alert or a question on a user interface of the device giving the user an option to join the conference. Although helpful, a variety of further enhancements to the user interface of mobile devices and their usability for conference calling and for other activities remain.

BRIEF DESCRIPTION OF THE DRAWINGS

In order to more fully explain describe various aspects, examples, and inventive embodiments, the following figures are provided, in which.

DETAILED DESCRIPTION

The following description provides examples and other disclosure, which teach those of ordinary skill in the art how to practice implementations and embodiments of inventive aspects described herein. As such, the description is not limiting, but rather is exemplary.

For convenience, in this description, the term "mobile transceiver device" (shorted in "device") is generally used to refer to any portable or mobile network-enabled device that has capabilities to send and receive data, such as data generated by web browsing, e-mail, SMS, instant messaging, and the like. As will become clear, a variety of devices in a variety of form factors can meet such a definition, including, for example, smartphones, laptops configured with appropriate network connections and user input devices, tablet computers, and netbooks.

In some mobile devices, a calendar application is provided to track and maintain upcoming appointments. Conference calls can be scheduled in the calendar application. A call initiation module can receive information from a calendar entry to call into and join a given conference. Such information can include a phone number and access code. However, unlike when talking to a person, for which a contact entry may exist in a contact manager, descriptive information about the conference call may not be available from the calendar application. Thus, when on the call, there is not much information to be displayed, nor in a call log. For example, if the call is accidently or prematurely disconnected, then only a phone number used to join the conference call may be displayed in a call log, rather than a name for the conference call. Aspects of this disclosure are thus directed to improving the usability of mobile devices that are used for such conference calling activities.

Figure 1:
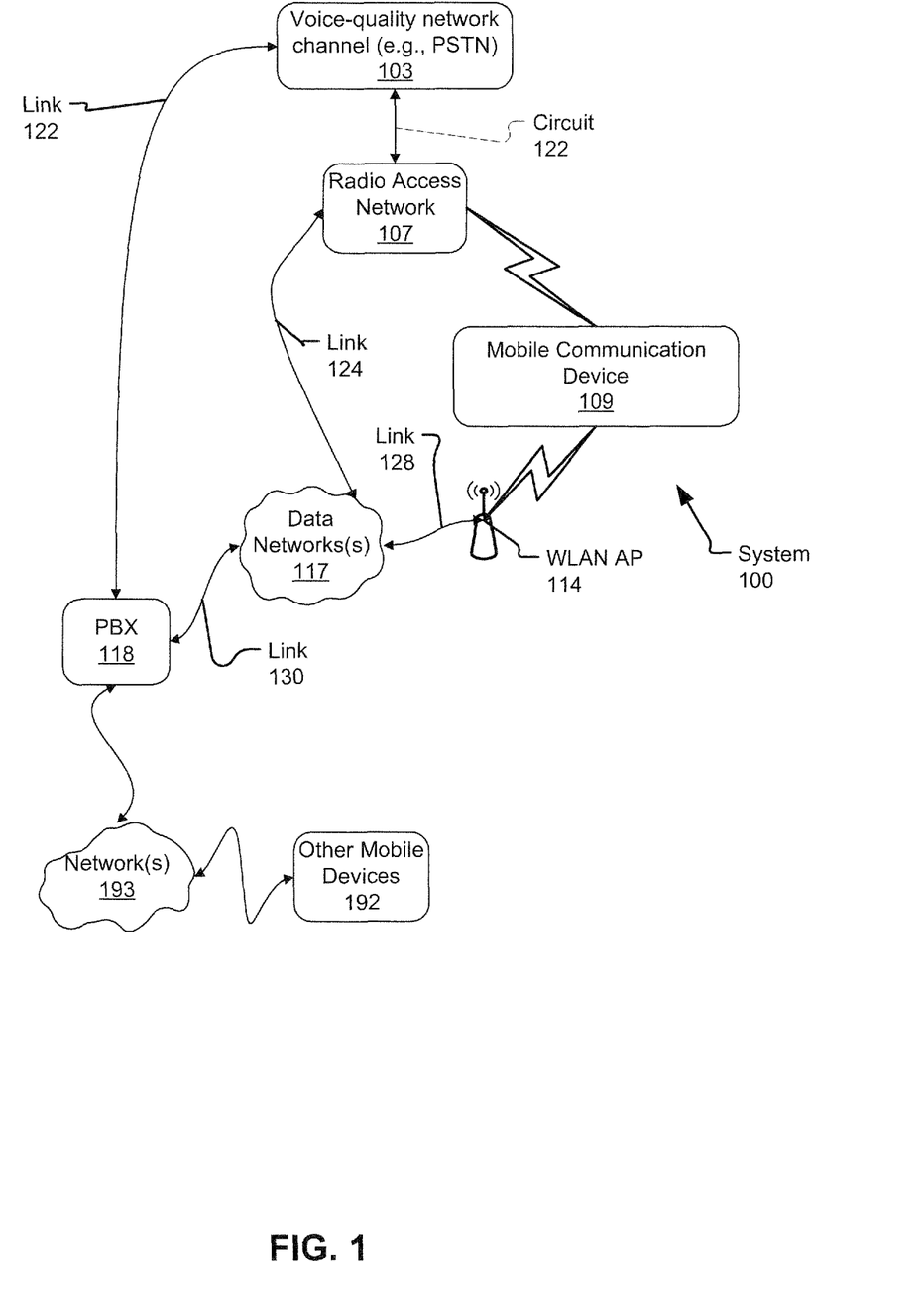
FIG. 1 depicts example components of a system in which described aspects can be embodied.

In a more specific example, FIG. 1 depicts a system architecture 100 in which a data-enabled mobile transceiver device 109 (device 109, hereinafter) can communicate with a broadcast radio receiver 113 over an interface 166. In one example, receiver 113 can be located or installed in an automobile 111.

Device 109 can communicate using a plurality of different wireless data communication protocols and standards. For example, device 109 can communicate over a radio access network (RAN) 107, which can be, for example, a cellular network. Examples of technologies that can be used for implementing RAN 107 include EDGE, UMTS, LTE, EVDO, GPRS, and other technologies for providing data transmit and receive capability to mobile devices.

Device 109 also can communicate with Local Area Network (LAN) wireless access points, such as WLAN AP 114. Technologies that can be used in providing such wireless LAN access include equipment based on the 802.11 series of IEEE standards. WLAN AP 114 can communicate over a link 128 with a data network 117, which in turn allows communication with e-commerce sites 119, over a link 130, sources of content 115, over a link 126. A search engine 103 (an example of one of a potential plurality of search engines) also is connected with data network 117 via link 122. Data network 117 can be implemented using the Internet, or more generally any collection of one or more networks that allow data communication among elements depicted in system 100.

The connections depicted can be implemented using public and/or private networks that can communicate using packet data technologies, such as X.25 or Internet Protocol (IP) based addressing and routing techniques. Some connections can be implemented as secure connections over leased lines, such as a frame relay, or using Virtual Private Network (VPN) technologies.

Device 109 may be used as a communication device for joining video and/or audio conferences. Device 109 also typically includes an application for managing a calendar (which can contain appointments and reminders for conference calls) and an application for managing contact information. Particularly in the case of conference calls, the information that can be stored describing or identifying such conference calls may be undesirably limited. In this disclosure, device 109 (including such associated applications), uses both a calendar application and a contact manager application to perform functions relating to such conference calling activity, as described below.

Figure 2:
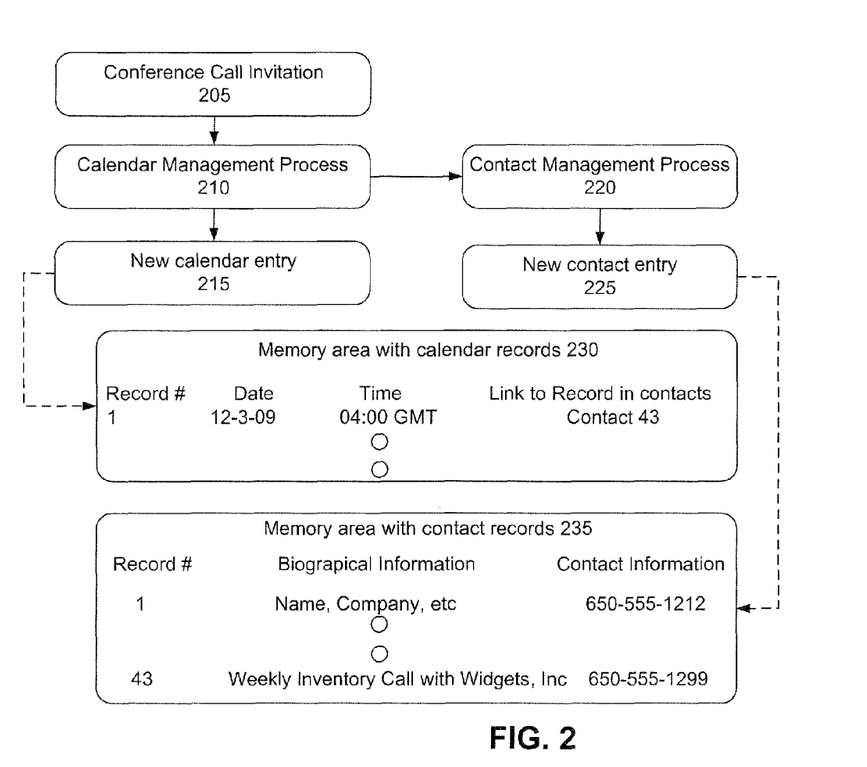
FIG. 2 depicts a flow of how applications and associated data to be used in those applications can be maintained and accessed to perform the methods disclosed herein.

FIG. 2 depicts an example of how information for a new conference call (such as a conference call being indicated through a conference call invitation 205) can be stored on a mobile device. Based on data contained in invitation 205, a calendar management process can cause a new calendar entry 215 to be created and stored in a memory (e.g., in a database with calendar records or other organized dataset) 230. A contact management process 220 also receives at least a portion of the information from invitation 205 (explained further below), and creates a new temporary contact entry 225 and arranges for storage of that contact entry 225 in a memory area for such information 235. Thus, information for a conference call is provided both in a calendar manager and a contact manager. For example, information about how to join the conference, such as dial-in phone number and authentication information can be stored with one or more of the calendar data and the contact data.

Figure 3:
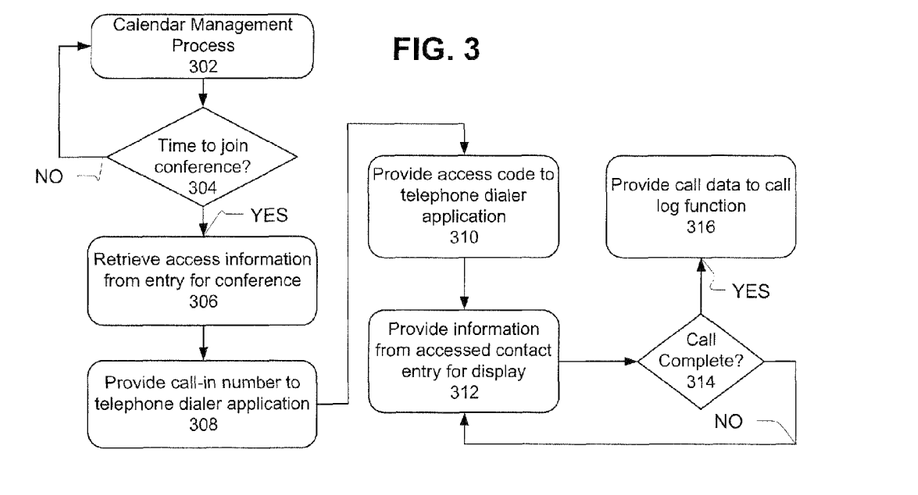
FIG. 3 depicts an overview method according to this disclosure.

FIG. 3 depicts a method in which the information stored/managed with these distinct applications can be used for conference calling. A calendar management process 302 tracks appointments and other events, including conference calls, that are presently scheduled. Upon determining that a time to join a conference call has arrived, access information can be retrieved, from one or more of the entry for the conference in the calendar manager and the corresponding entry in the contact manager (as will be described, two examples are presented, corresponding to each approach). The call-in number (part of the access information) is provided to a telephone dialer application along with an access code (if required) (308, 310). In conjunction, the contact entry is accessed and information from that contact entry is displayed (e.g., information such as a title of the conference). The display can continue while the call continues, and upon call completion (or for example, call failure), a call log function records an entry in a call log corresponding to the call, and using information, such as the name, from the contact entry.

Aspects presented in this overview will be explained in more detail with respect to the figures that follow.

Figure 4:
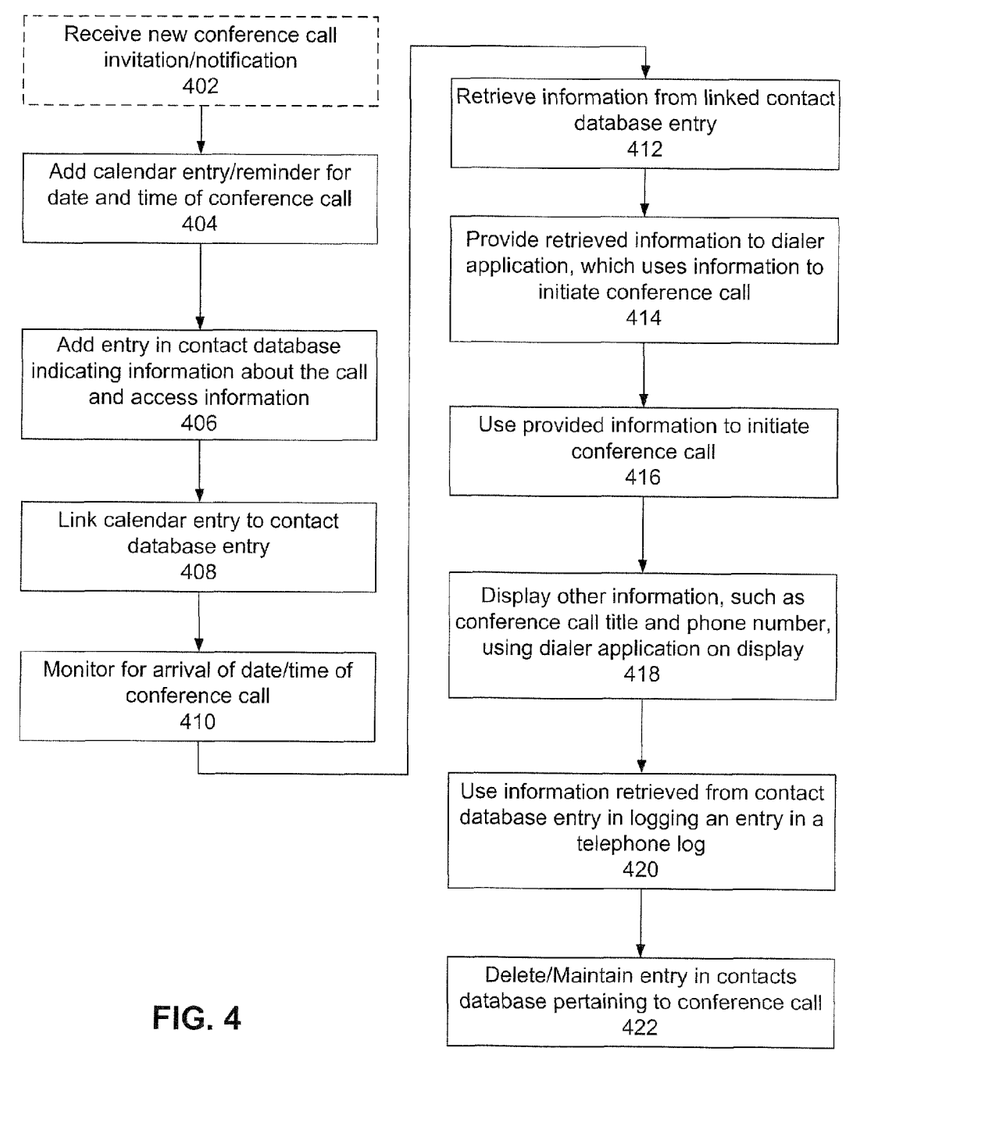
FIG. 4 depicts a more particular example of a method according to this disclosure.
Figure 5:
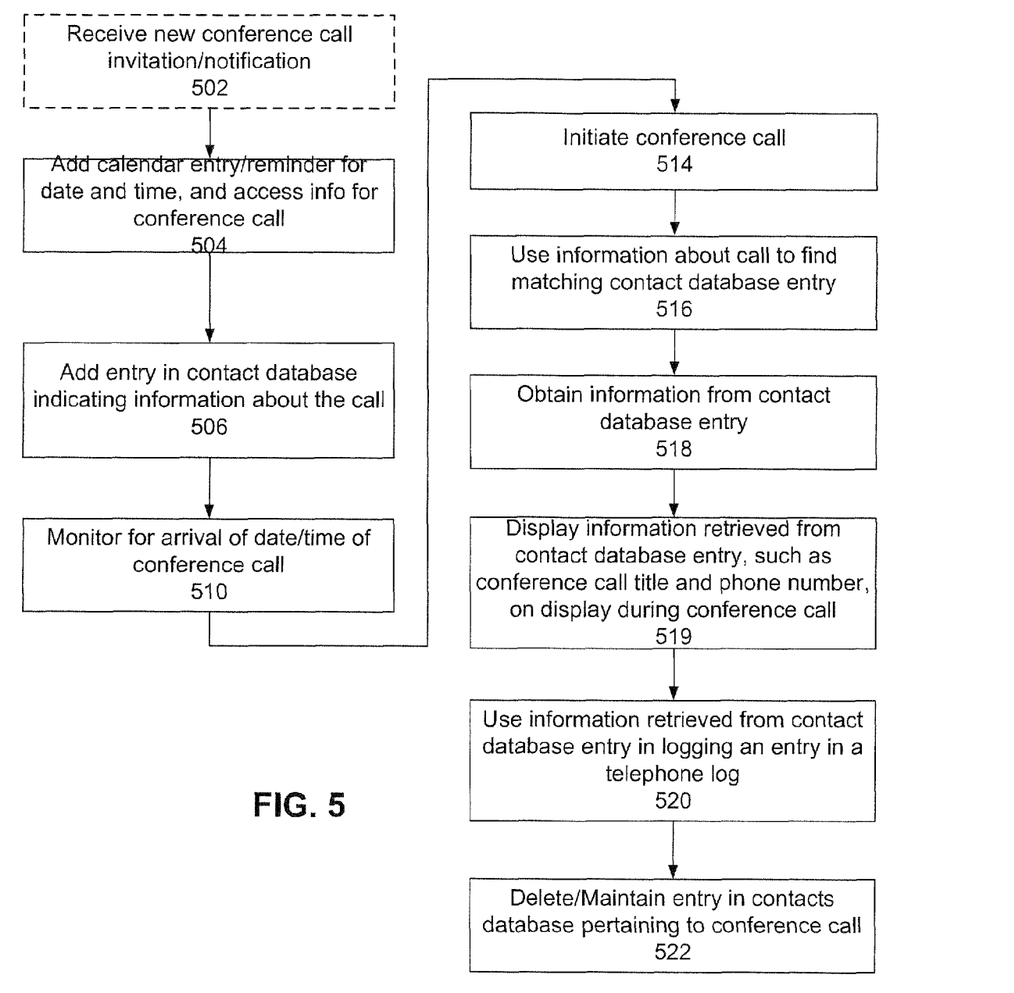
FIG. 5 depicts another more particular example of a method according to this disclosure.

FIG. 4 depicts a method in which the a calendar entry that tracks a start time for a call is maintained in a calendar application, while a contact entry created corresponding to a given call includes access information and identifying information for the call. Upon determining that a time for a call has arrived, the calendar application follows a link in the calendar entry to a corresponding entry in the contact database, and obtains the access information and uses the obtained access information to join the call. Name information also is obtained from the entry and used to update the display. FIG. 5 depicts a method in which the access information for a given call is stored in a calendar entry, and information about the calendar entry is used to search a contacts database to find a matching temporary contact for the calendar entry. The information from that temporary contact is then used to update the display.

By way of further explanation, in FIG. 4, the depicted method includes reception of a new conference call invitation/notification (for example, the user at the mobile device also can generate a new call) (402). A new calendar entry or reminder corresponding to the date/time of the call is added (404) to a calendar (e.g., calendar 230) maintained on device 109. An entry is added (406) to a contact database (235) with a name and potentially other indentifying information for the new call. The calendar entry is linked (408) to the contact database entry. An arrival time for the conference call is monitored (410) by the calendar application. Upon such arrival, access information is obtained (412) from the linked contact database entry. The obtained access information is provided (414) to a dialer application, which causes device 109 to join the call. Descriptive information obtained (412) from the contact database entry is used to update a display on device 109, with information such as a name for the call. Subsequently, information retrieved from the contact entry also is used to update a call log, with information including a name for the call (420). The entry in the contacts database can be deleted (422), if the call is a one-time call and can be maintained if the call is to be repeated.

By way of further explanation, in FIG. 5, the depicted method includes reception of a new conference call invitation/notification (for example, the user at the mobile device also can generate a new call) (502). A new calendar entry or reminder corresponding to the date/time of the call is added (504) to a calendar (e.g., calendar 230) maintained on device 109. An entry is added (506) to a contact database (235) with a name and potentially other indentifying information for the new call. An arrival time for the conference call is monitored (510) by the calendar application, and upon arrival of such time, the conference call is initiated (514). The information about the call from the calendar entry also is used to find a matching contact database entry (516), from which information is obtained (518). The information obtained from the contact database entry is used to form (519) a display that includes such information as a conference call title. Upon completion of the call, information obtained from the contact database entry is used to update (520) the telephone log. The contact entry for the conference call can be deleted (522), if the conference call is not to be repeated (or even if the call is repeated, the temporary contact can be created again, per 506, above).

Figure 6:
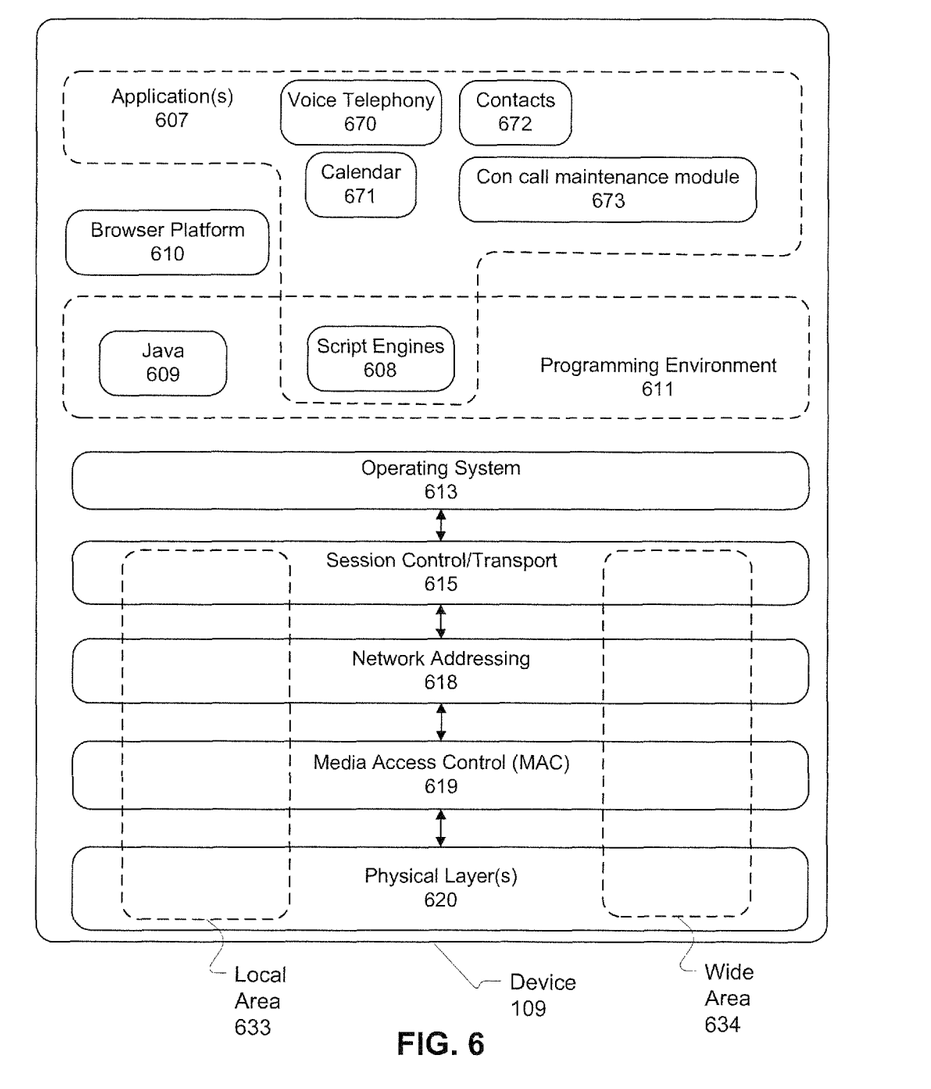
FIG. 6 depicts a functional module view of a mobile transceiver device that can be used in the FIG. 1 system.

FIG. 6 depicts an example functional arrangement for an embodiment of device 109. According to FIG. 6, device 109 can comprise a local area network 633 and wide area network 634 capabilities. To implement these capabilities, FIG. 6 depicts that device 109 comprises one or more physical layers 620, which communicate with one or more Media Access Control (MAC) functions (619) appropriate for the physical media. For example, MAC algorithms for a local area wireless technology such as 802.11 desirably are different from a MAC for a cellular wireless technology and from a wired local area network. Respective MAC layers communicate with a network addressing layer (618). Network addressing can be common between different networks, for example Internet Protocol (IP) addressing can be used over 802.11 type wireless LANs, Bluetooth, and cellular wireless. Network address 618 communicates with a session control/transport layer (617); common transport protocols include TCP and UDP, both of which can be used with IP addressing. An operating system 613 can communicate with the session control/transport (617) functions, on behalf of applications. The logical division depicted here is for explanation purposes and some embodiments can provide an operating system that comprises session control/transport 617 and network addressing 618 functionality.

Operating system 613 provides a platform on which applications can be developed. A programming environment 611 can be provided as part of operating system 613 or as an additional middle ware layer to which applications can be developed. For example, programming environment 611 can comprise a set of script engines 608, and a java 609 implementation. Script engines 608 comprise interpreters for scripting languages in which scripts to accomplish tasks can be written. Java 609 can provide a set of pre-defined routines and other functions that can be called by an application. A browser platform 610 can be written to use the script engines 608 and Java 609 implementation. Browser platform 610 can comprise markup and script language renderers. Browser platform 610 may install Java 609 and script engines 608, which it will use. Applications 607 can be written to use browser platform 610, Java 609, script engines 608, as well as other functions provided by operating system 613. Applications 607 can be written to use programming interfaces provided by these elements, such as using published procedure names and passing appropriate arguments when calling such procedures. Applications also can inter-operate and exchange information, either using operating system 613 or by another programming model. Functional modules can be provided that are used by applications 607, or which are themselves applications that can be used. For example, a voice telephony module 670, a calendar module 671, a contacts module 672, and a con call maintenance module 673 can be provided for use in implementing aspects according to this disclosure, such as the methods depicted in FIGS. 3-5. For example, conference call maintenance module 673 can be operable to store, with the identifying information in contacts module 672, access information for joining a conference call, as explained with respect to those figures.

Figure 7:
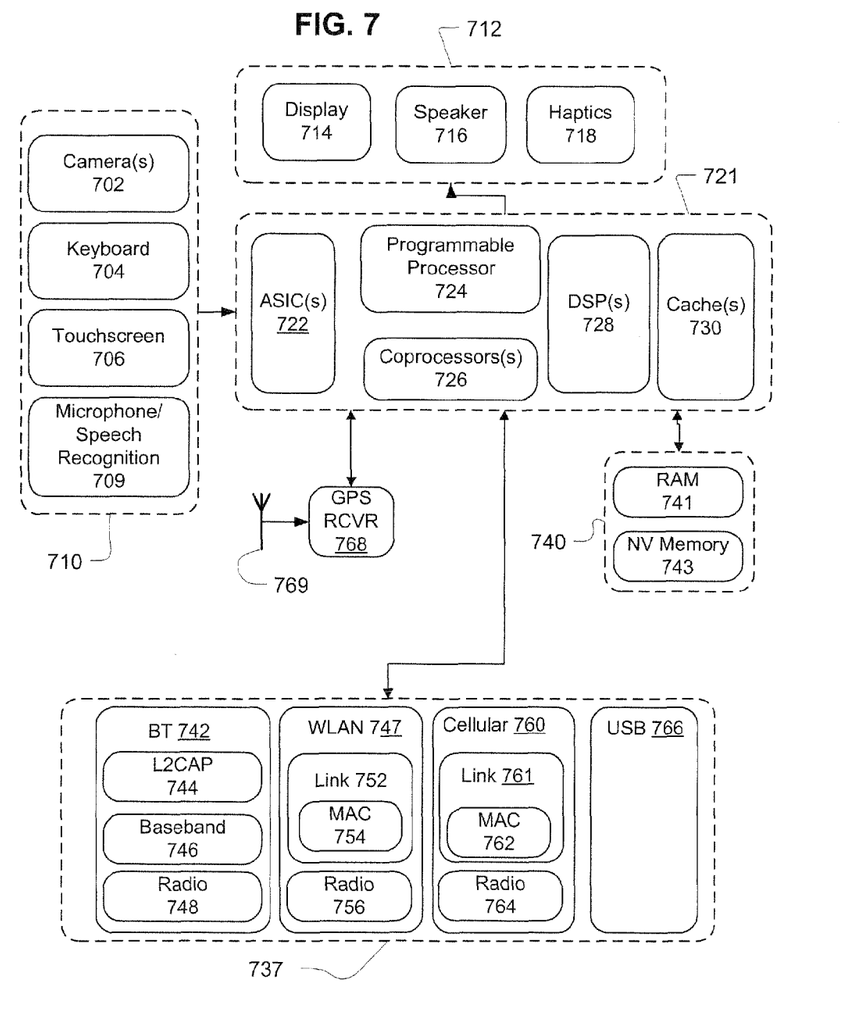
FIG. 7 depicts an overview of some physical components of a mobile transceiver device, which can be used in implementing the functional modules depicted in FIG. 6.

FIG. 7 depicts example components that can be used in implementing a mobile transceiver device 109 according to the above description. FIG. 7 depicts that a processing module 721 may be composed of a plurality of different processing elements, including one or more ASICs 722, a programmable processor 724, one or more co-processors 726, which each can be fixed function, reconfigurable or programmable, one or more digital signal processors 728. For example, an ASIC or co-processor may be provided for implementing graphics functionality, encryption and decryption, audio filtering, and other such functions that often involve many repetitive, math-intensive steps. Processing module 721 can comprise memory to be used during processing, such as one or more cache memories 730.

Processing module 721 communicates with mass storage 740, which can be composed of a Random Access Memory 741 and of non-volatile memory 743. Non-volatile memory 743 can be implemented with one or more of Flash memory, PROM, EPROM, and so on. Non-volatile memory 743 can be implemented as flash memory, ferromagnetic, phase-change memory, and other non-volatile memory technologies. Non-volatile memory 743 also can store programs, device state, various user information, one or more operating systems, device configuration data, and other data that may need to be accessed persistently.

User input interface 710 can comprise a plurality of different sources of user input, such as a camera 702, a keyboard 704, a touchscreen 706, and a microphone, which can provide input to speech recognition functionality 708. Processing module 721 also can receive input from a GPS receiver 768, which processes signals received from antenna 769. Processing module 721 also can use a variety of network communication protocols, grouped for description purposes here into a communication module 737, which can include a Bluetooth communication stack 742, which comprises a L2CAP layer 744, a baseband 746 and a radio 748. Communications module 737 also can comprise a Wireless Local Area Network (747) interface, which comprises a link layer 752 with a MAC 754, and a radio 756. Communications module 737 also can comprise a cellular broadband data network interface 750, which in turn comprises a link layer 761, with MAC 762. Cellular interface 750 also can comprise a radio for an appropriate frequency spectrum 764. Communications module 737 also can comprise a USB interface 766, to provide wired data communication capability. Other wireless and wired communication technologies also can be provided, and this description is exemplary.

Figure 8:
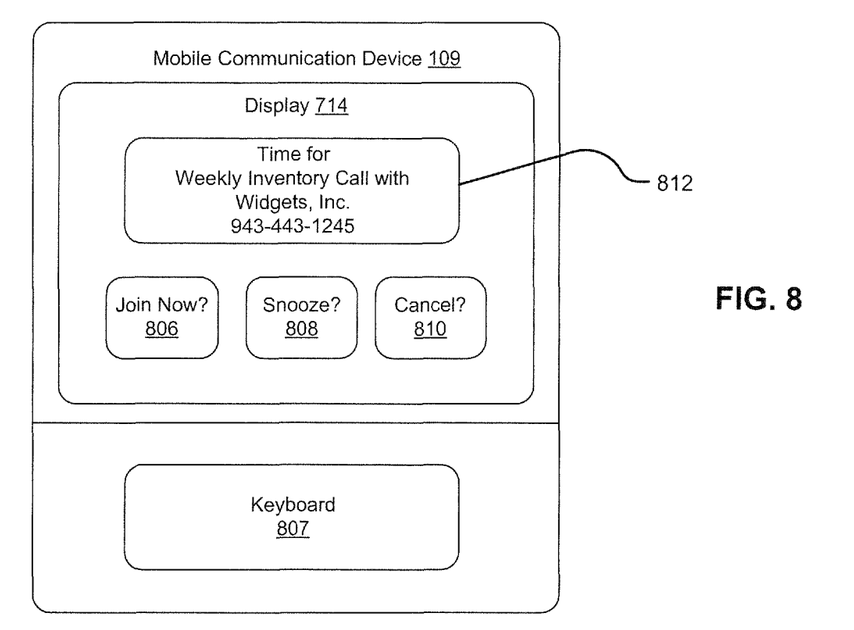
FIG. 8 depicts an example user interface according to this disclosure.
Figure 9:
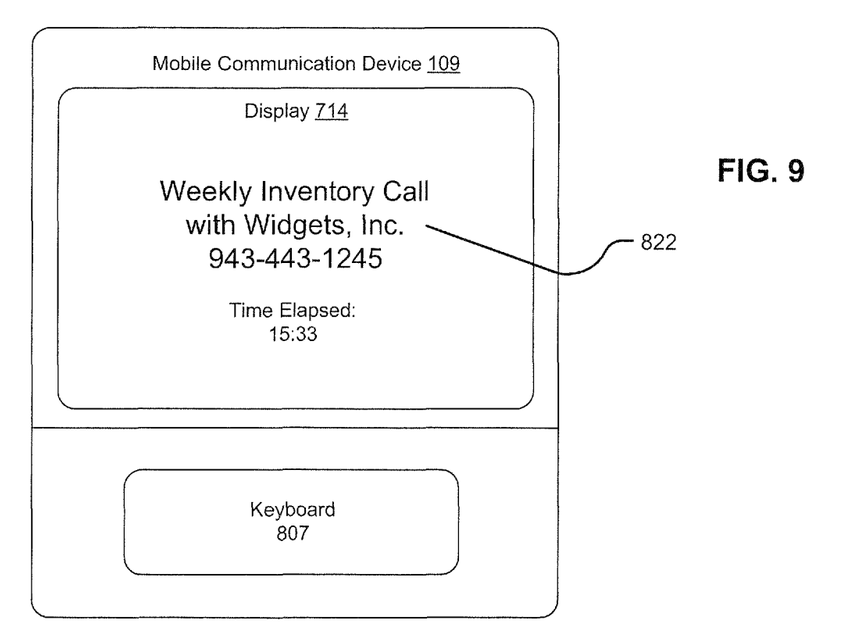
FIG. 9 depicts another example user interface according to his disclosure.

FIGS. 8 and 9 depict content of example user interfaces according to this disclosure. In particular, FIG. 8 depicts elements of an example display that can be shown for allowing a user to selectively join a conference call, where information about the conference call can be obtained from a contact entry provided with the conference call information. In particular, device 109 can include display 714 (see FIG. 7), and when a time has arrived to join a conference call, display 714 can display information about the call, including a name for the call, as depicted by 812 Selectable buttons for joining (806), snoozing (808) and cancelling (810) can be provided. For reference, a keyboard 807 is depicted, but it would be understood that some types of devices may have a keyboard and others may not (or the keyboard may be implemented in a slideout fashion, or provided virtually on a display).

FIG. 9 depicts an example of what is displayed on display 714 during a conference call. In particular, a name of the conference call is displayed (822) during the call. By contrast, without accessing the information from the contact entry, only a phone number would be displayed or otherwise recorded in a call log.

In sum, this disclosure provides examples of how more detailed and helpful information can be provided for conference calling on devices that have software in which only a phone number is displayed or otherwise available through normal conference call processes. In particular, by provision of a contact entry, which can be linked to a calendar entry, or identified based on identifying information in the calendar entry, the contact entry can be used as a repository of information to be displayed or otherwise used during and after the conference call. Also, although a phone number was depicted as an example of access information for a conference call, other information such as an IP address or another handle by which a service offering the conference call can be accessed. Therefore, examples involving usage of technology and other terminology associated with the PSTN does not imply a limitation that any device or method according to this disclosure is limited to usage with the PSTN.

Separate boxes or illustrated separation of functional elements of illustrated systems does not necessarily require physical separation of such functions, as communications between such elements can occur by way of messaging, function calls, shared memory space, and so on, without any such physical separation. As such, functions need not be implemented in physically or logically separated platforms, although they are illustrated separately for ease of explanation herein.

For example, different embodiments of devices can provide some functions in an operating system installation that are provided at an application layer or in a middle layer in other devices. Different devices can have different designs, such that while some devices implement some functions in fixed function hardware, other devices can implement such functions in a programmable processor with code obtained from a computer readable medium.

More generally, a person of ordinary skill would be able to adapt these disclosures to implementations of any of a variety of communication devices. Similarly, a person of ordinary skill would be able to use these disclosures to produce implementations and embodiments on different physical platforms or form factors without deviating from the scope of the claims and their equivalents.

We claim:

1. A method for implementation on a mobile device, comprising:
   providing a temporary contact in an address book stored on the mobile device, the temporary contact comprising data indicative of a name of a conference call and access information for the conference call;
   scheduling the conference call by creating an entry in a calendar application;
   monitoring whether a time for the conference call has arrived, and if so then obtaining the access information for the conference call;
   using the obtained access information to join the conference call, wherein the obtained access information includes an authentication code for the conference call;
   searching the address book for the temporary contact using the authentication code for the conference call;
   accessing the name of the conference call from the temporary contact identified by the search; and
   storing a record of the conference call in a log, the record comprising the conference call name accessed from the temporary contact and a conference dial-in number, such that the record, when accessed, displays the conference call name and conference dial-in number.

2. The method of claim 1, further comprising linking the temporary contact from the address book to the entry in the calendar application and following the link to obtain the access information.

3. The method of claim 1, further comprising storing the access information with the calendar application.

4. The method of claim 3, wherein the searching is performed using the access information.

5. The method of claim 1, further comprising deleting the temporary contact after the conference call has ended.

6. The method of claim 1, further comprising maintaining the temporary contact, if the conference call is expected to be repeated.

7. The method of claim 1, wherein a calendar invitation is received through electronic mail, addressed to a user of the device.

8. The method of claim 1, wherein the accessed name of the conference call is displayed during the conference call.

9. The method of claim 1, wherein a conference dial-in number is displayed during the conference call.

10. A non-transient computer readable medium storing instructions that are executable by a device to cause the device to perform a method, the method comprising:
    providing a temporary contact in an address book stored on a mobile device, the temporary contact comprising data indicative of a name of a conference call and access information for the conference call;
    scheduling the conference call by creating an entry in a calendar application;
    monitoring whether a time for the conference call has arrived, and if so then accessing access information for the conference call from at least one of the temporary contact in the address book and the entry of the calendar application;
    using the obtained access information to join the conference call, wherein the obtained access information includes an authentication code for the conference call;
    searching the address book for the temporary contact using the authentication code for the conference call;
    accessing the name of the conference call from the temporary contact identified by the search; and
    storing a record of the conference call in a log, the record comprising the conference call name accessed from the temporary contact and a conference dial-in number, such that the record, when accessed, displays the conference call name and conference dial-in number.

11. The computer readable medium of claim 10, wherein the method further comprises linking the temporary contact from the address book to the entry in the calendar application and following the link to obtain the access information.

12. The computer readable medium of claim 10, wherein the method further comprises storing the access information with the calendar application.

13. The computer readable medium of claim 12, wherein the searching is performed using the access information.

14. The computer readable medium of claim 10, wherein the method further comprises deleting the temporary contact after the conference call has ended.

15. The computer readable medium of claim 10, further comprising maintaining the temporary contact, if the conference call is expected to be repeated.

16. The computer readable medium of claim 10, wherein a calendar invitation is received through electronic mail, addressed to a user of the device.

17. A mobile device, comprising a processor coupled with a computer readable medium and a network interface configured to implement modules comprising:
    a voice telephony module configured to establish a voice channel based on access information provided to the voice telephony module;
    a contacts module configured to maintain data representing contact entries, each contact entry capable of storing a name;
    a calendar module configured to maintain entries comprising a date and time; and
    a conference call maintenance module configured to:
    use the calendar module to establish a calendar entry for a conference call,
    use the contacts module to store identifying information for the conference call in a corresponding contacts entry,
    store access information in one or more of the calendar entry and the contacts entry, wherein the access information includes an authentication code for the conference call,
    provide the access information to the voice telephony module for joining the conference call,
    search the address book for the temporary contact using the authentication code for the conference call, and
    access the identifying information stored in the contacts module for display during the conference call and for storing a record of the conference call in a log, the record comprising the conference call name accessed from the temporary contact identified by the search and a conference dial-in number, such that the record, when accessed, displays the conference call name and conference dial-in number.

18. The mobile device of claim 17, wherein the conference call maintenance module is further configured to store with the identifying information in the contacts module, access information for joining the conference call.

19. The mobile device of claim 18, wherein the access information for joining the conference call is retrieved through the contacts module and used to join the conference call.

* * * * *